(12) United States Patent
Ohashi et al.

(10) Patent No.: US 10,974,343 B2
(45) Date of Patent: Apr. 13, 2021

(54) FRICTION STIR SPOT JOINING APPARATUS AND FRICTION STIR SPOT JOINING METHOD

(71) Applicant: KAWASAKI JUKOGYO KABUSHIKI KAISHA, Kobe (JP)

(72) Inventors: Ryoji Ohashi, Kobe (JP); Yoshitaka Muramatsu, Akashi (JP); Masahiro Miyake, Kobe (JP); Takuya Fukuda, Kakogawa (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 257 days.

(21) Appl. No.: 15/770,226

(22) PCT Filed: Oct. 14, 2016

(86) PCT No.: PCT/JP2016/004590
§ 371 (c)(1),
(2) Date: Apr. 23, 2018

(87) PCT Pub. No.: WO2017/068768
PCT Pub. Date: Apr. 27, 2017

(65) Prior Publication Data
US 2018/0304401 A1    Oct. 25, 2018

(30) Foreign Application Priority Data

Oct. 21, 2015   (JP) .............................. JP2015-207354

(51) Int. Cl.
*B23K 20/12*   (2006.01)
(52) U.S. Cl.
CPC .......... *B23K 20/1235* (2013.01); *B23K 20/12* (2013.01); *B23K 20/1255* (2013.01)

(58) Field of Classification Search
None
See application file for complete search history.

(56) References Cited

U.S. PATENT DOCUMENTS

2003/0029903 A1   2/2003   Kashiki et al.
2005/0006438 A1*  1/2005   Andersson ......... B23K 20/1235
                                                    228/112.1
(Continued)

FOREIGN PATENT DOCUMENTS

EP   1882543 A1   1/2008
JP   3471338 B2   12/2003

*Primary Examiner* — Devang R Patel
(74) *Attorney, Agent, or Firm* — Oliff PLC

(57) ABSTRACT

A friction stir spot joining apparatus for spot-joining a pair of plate members by friction stirring with a tool's pin portion includes an advancing and retracting driving device configured to advance and retract the tool to and from plate members, a rotationally driving device configured to rotate the tool, and control device configured to control advancing and retracting driving device and rotationally driving device. The control device executes joining control of pushing pin portion into plate members while the tool is rotated and causing pin portion to pressurize plate members, and executes heat dissipation control of reducing at least one of a rotation speed and a tool's pressurization force more than in the joining control while tool is rotated and pin portion is kept pushed into plate members after joining control and separating tool from plate members after the pin portion's surface temperature becomes less than an oxidation onset temperature.

6 Claims, 8 Drawing Sheets

(56) References Cited

U.S. PATENT DOCUMENTS

2008/0023524 A1\* 1/2008 Ohashi .............. B23K 20/1245
  228/2.1
2012/0261457 A1\* 10/2012 Ohashi .............. B23K 20/1235
  228/102
2014/0069986 A1\* 3/2014 Okada ............... B23K 20/1265
  228/112.1

\* cited by examiner

[Fig. 2]
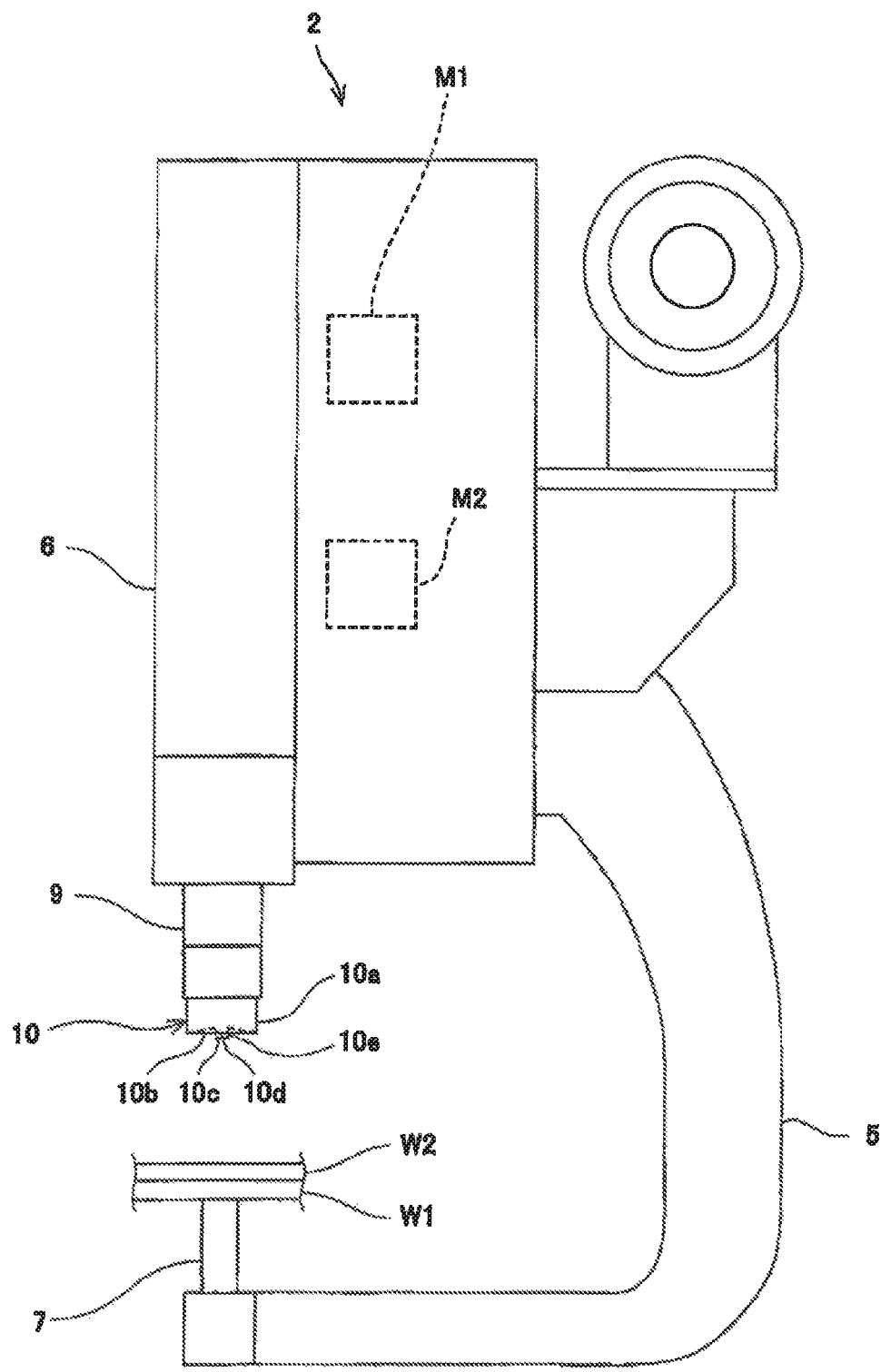

[Fig. 3]
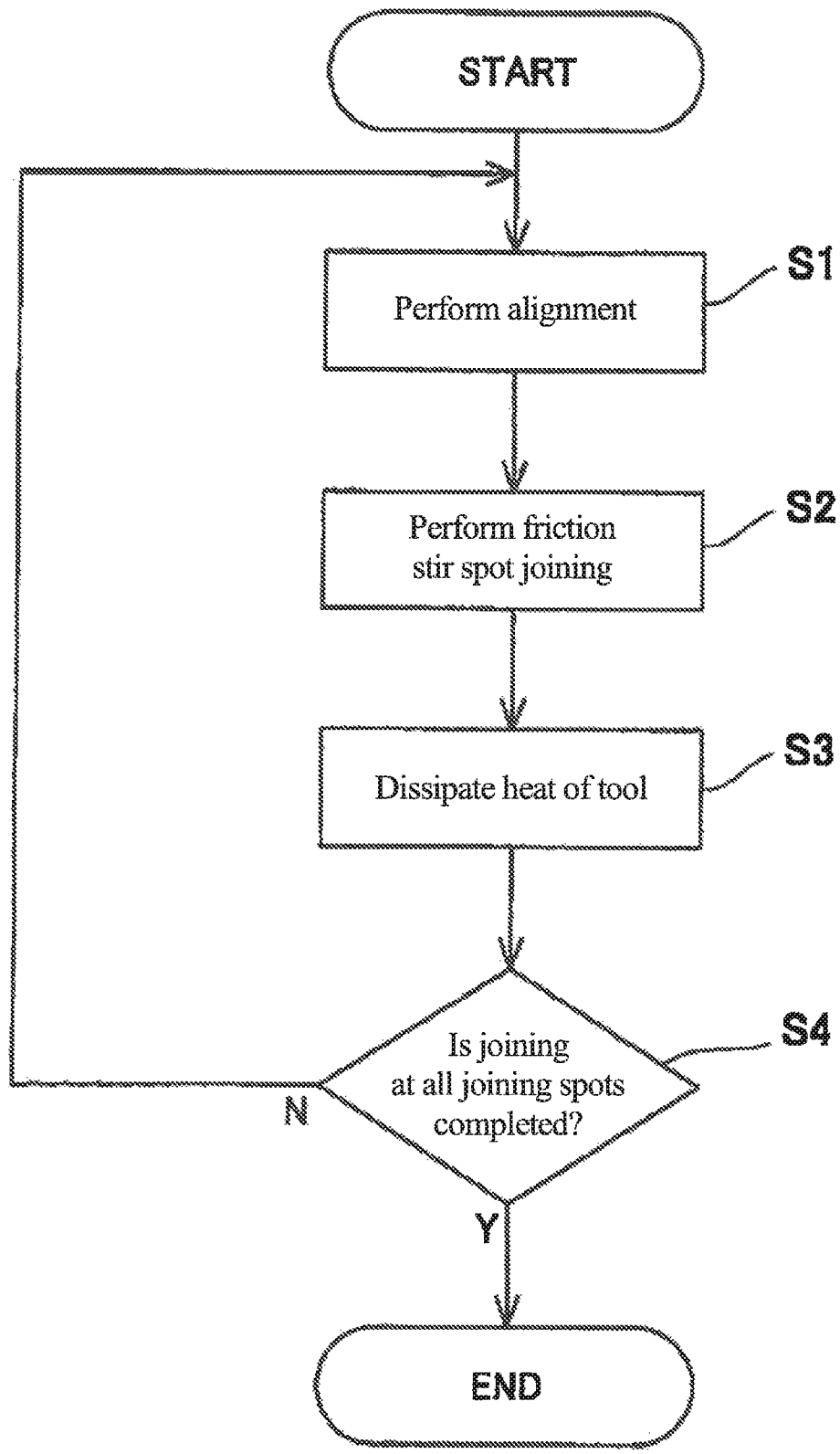

[Fig. 4]
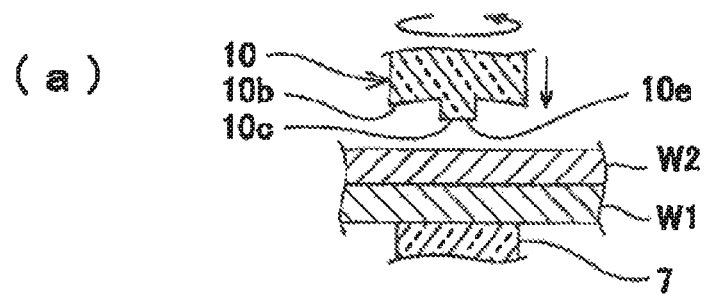
(a)
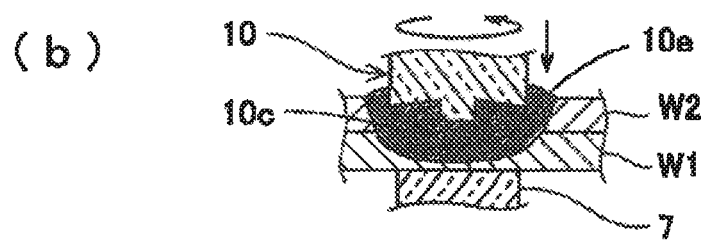
(b)
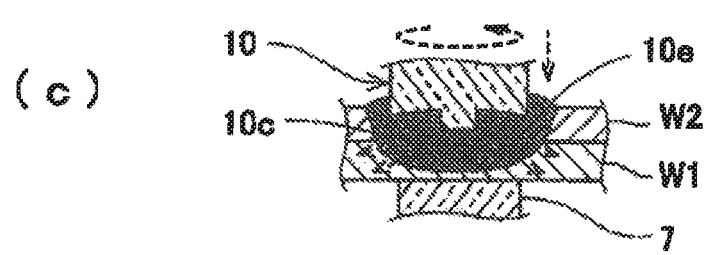
(c)
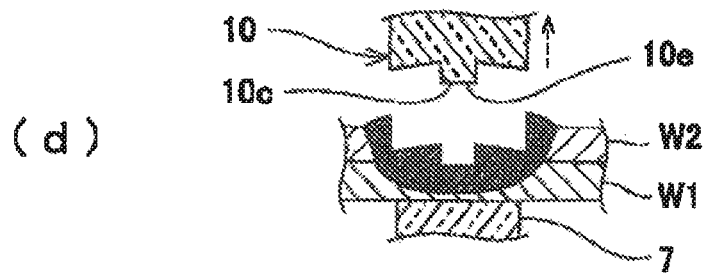
(d)

[Fig. 5]
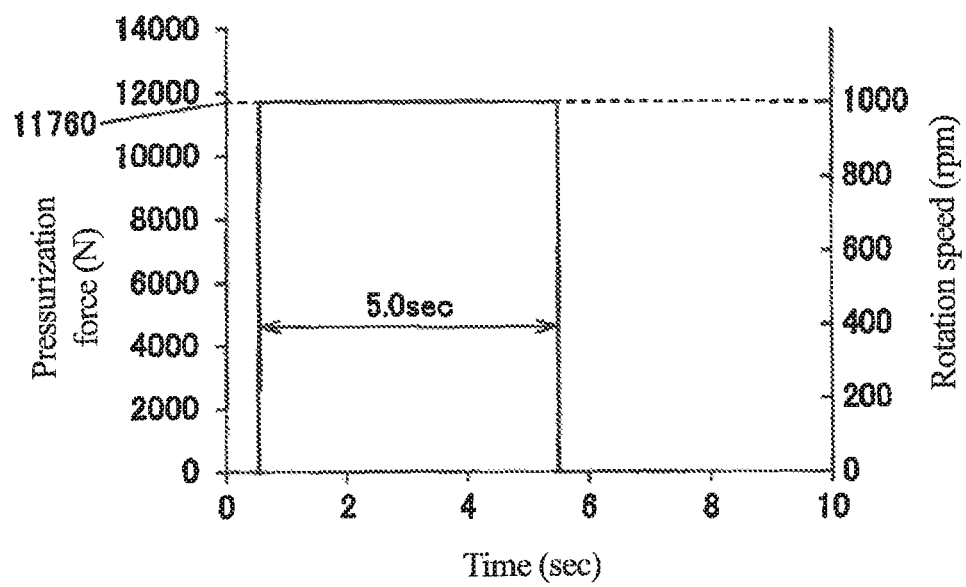
[Fig. 6]
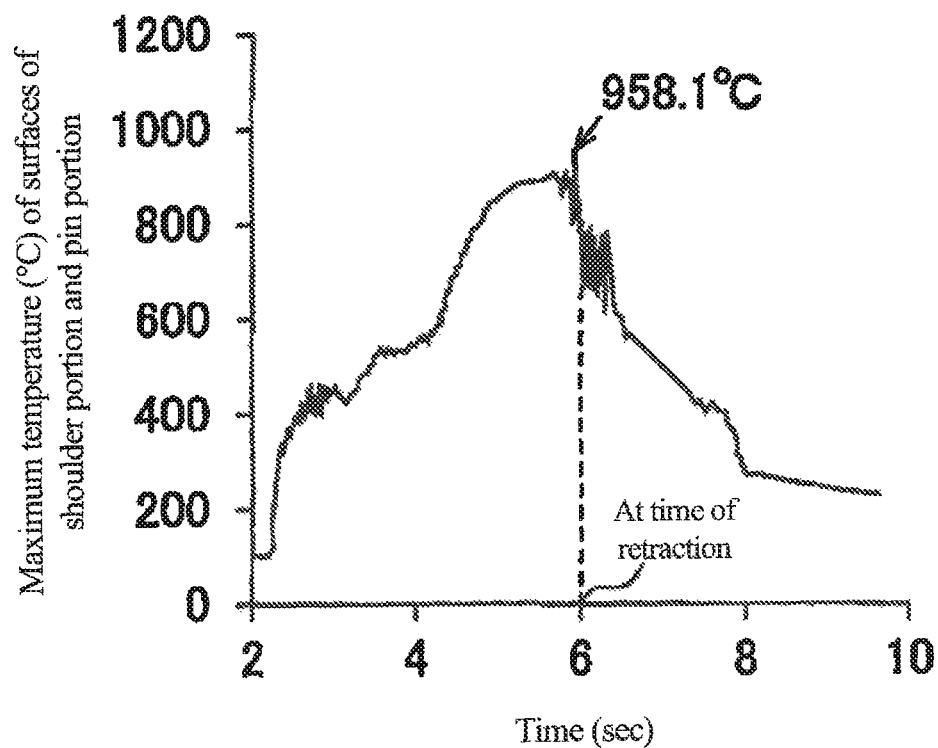

[Fig. 7]
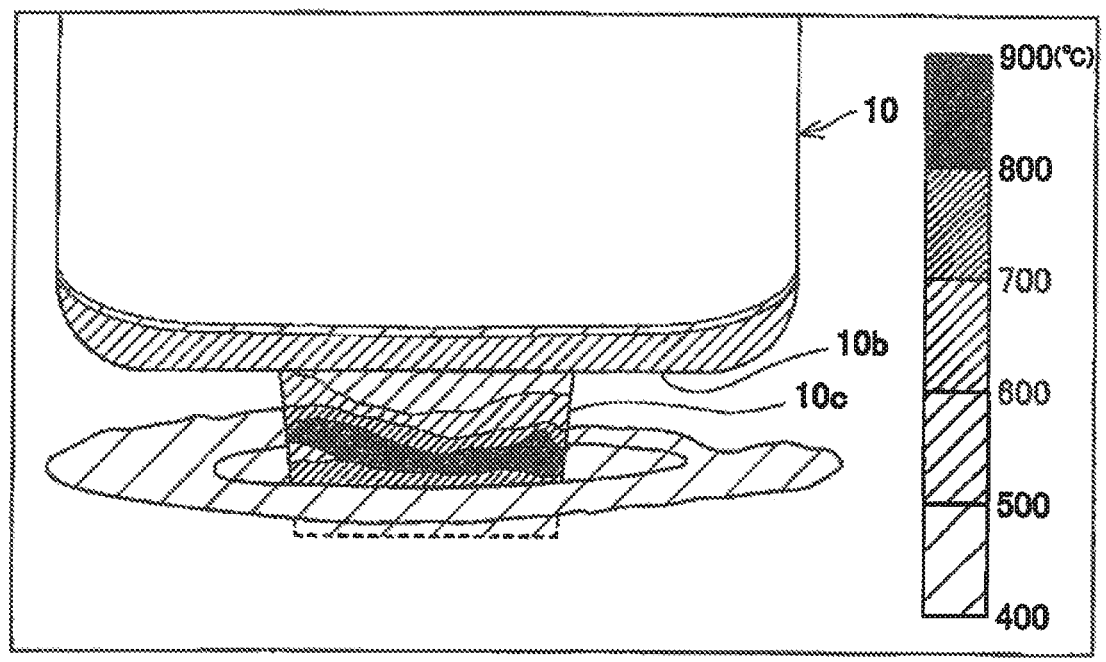
[Fig. 8]
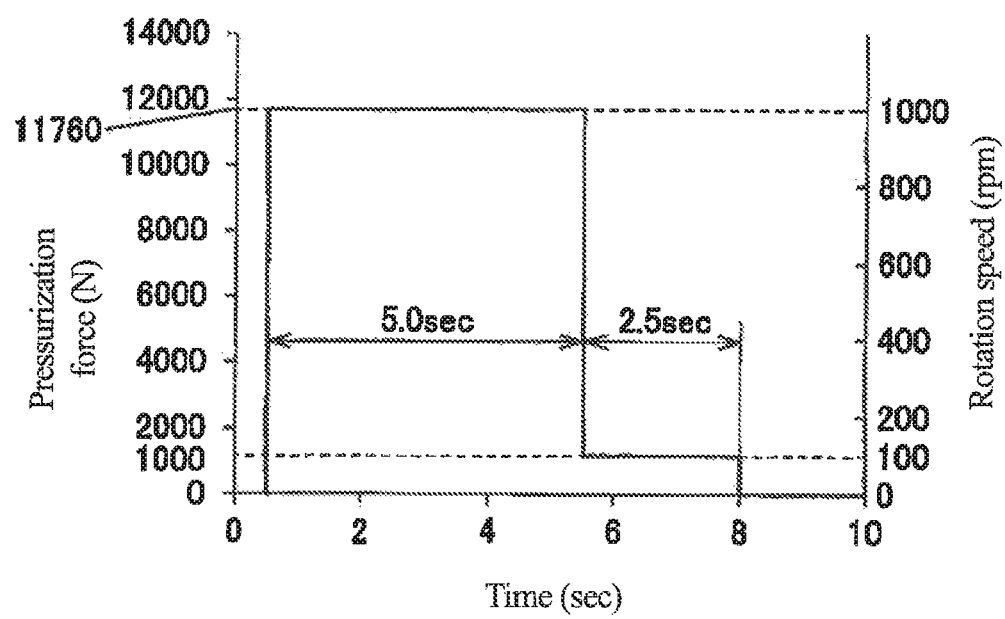

[Fig. 9]
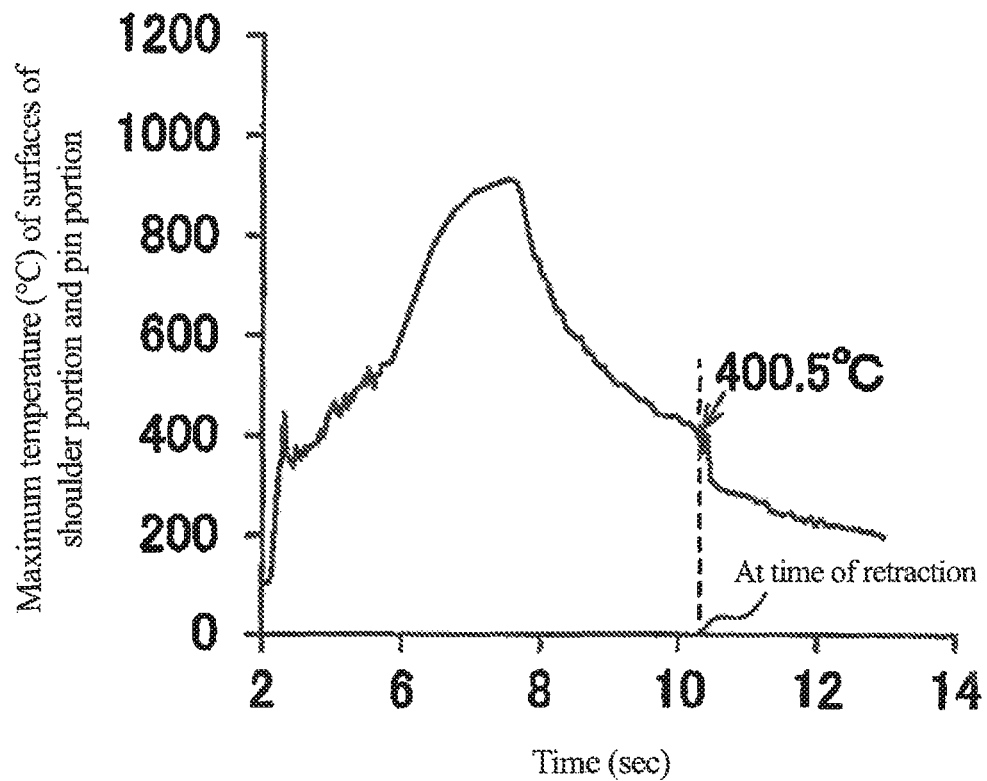
[Fig. 10]
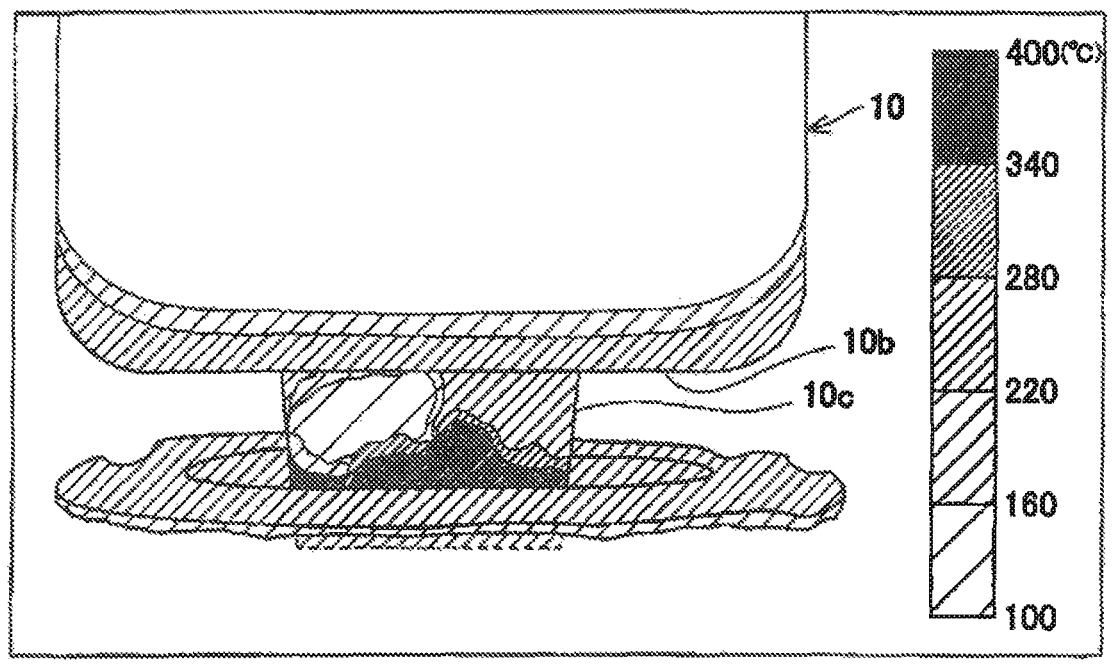

[Fig. 11]
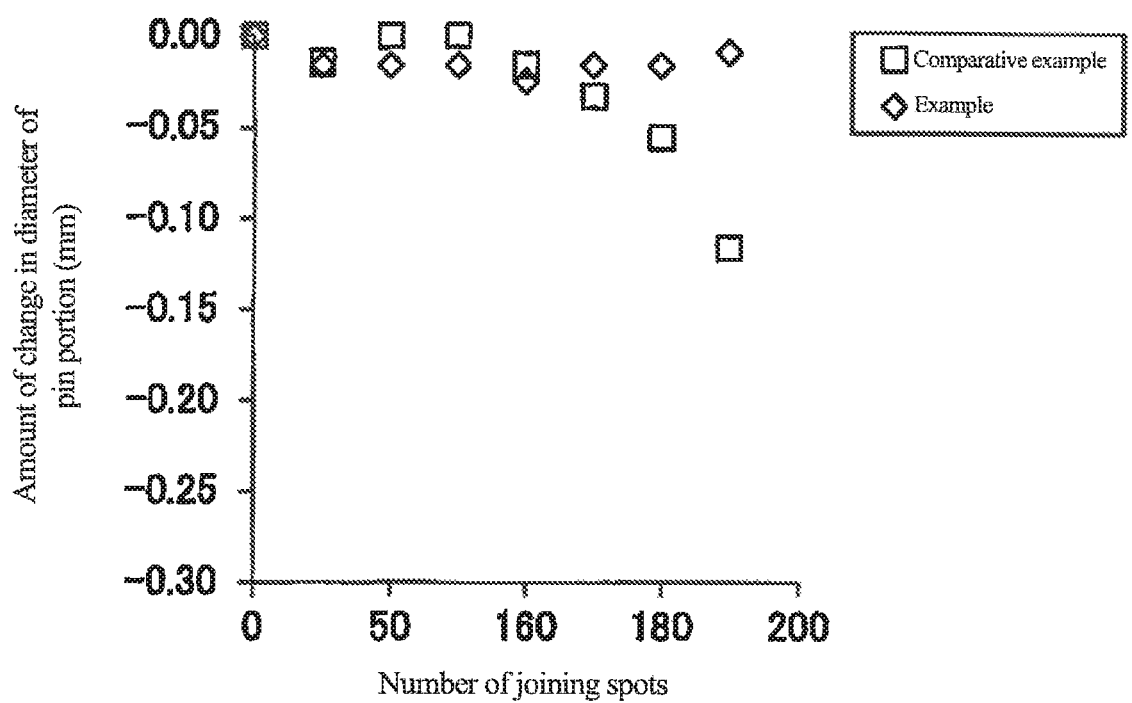

FRICTION STIR SPOT JOINING APPARATUS AND FRICTION STIR SPOT JOINING METHOD

TECHNICAL FIELD

The present invention relates to a friction stir spot joining apparatus and a friction stir spot joining method.

BACKGROUND ART

Conventionally, as a method of joining a pair of plate members to each other, a friction stir spot joining method (Friction Spot Joining) is known. In the case of joining a pair of plate members by this method, for example, as disclosed in PTL 1, a tool of a friction stir spot joining apparatus is pushed into a pair of overlaid plate members while being rotated, and is retracted after the joining is completed. As a result, the pair of plate members are joined by friction stir spot joining.

CITATION LIST

Patent Literature

PTL 1: Japanese Patent No. 3471338

SUMMARY OF INVENTION

Technical Problem

The surface temperature of the tool immediately after friction stir spot joining varies depending on, for example, the material for a pair of plate members to be joined. Depending on the surface temperature of the tool after friction stir spot joining, the surface of the tool which is in contact with the pair of plate members when the tool is pushed into the plate members is sometimes oxidized by the atmosphere when the tool s retracted from the pair of plate members. When the surface of the tool is oxidized in this manner, the tool deteriorates and its durability performance decreases, resulting in a shorter service life.

It is therefore an object of the present invention to reduce the deterioration of the tool caused by oxidation by the atmosphere and maintain the durability performance of the tool by preventing the surface of the tool from being oxidized by the atmosphere after friction stir spot joining, thereby prolonging the service life of the tool.

Solution to Problem

In order to solve the above problems, a friction stir spot joining apparatus according to an aspect of the present invention is a friction stir spot joining apparatus for spot-joining a pair of plate members by friction stirring with a pin portion of a tool, the apparatus including an advancing and retracting driving device configured to advance and retract the tool to and from the pair of plate members, a rotationally driving device configured to rotate the tool, and a control device configured to control the advancing and retracting driving device and the rotationally driving device, wherein the control device executes joining control of pushing the pin portion into the pair of plate members while the tool is rotated and causing the pin portion to pressurize the pair of plate members and executes heat dissipation control of reducing at least one of a rotation speed and a pressurization force of the tool more than in the joining control while the tool is rotated and the pin portion is kept pushed into the pair of plate members after the joining control and separating the tool from the pair of plate members after a surface temperature of the pin portion becomes less than an oxidation onset temperature.

According to the above configuration, because the surface temperature of the pin portion is lower than the oxidation onset temperature when the tool is separated from the plate members after friction stir spot joining, the surface of the pin portion can be prevented from being oxidized by the atmosphere. This can reduce deterioration in the tool and maintain the durability performance of the tool to thereby prolong the service life of the tool.

The surface temperature of the pin portion may be a surface temperature of a coating portion formed on the pin portion. This makes it possible to prevent the coating portion formed on the pin portion from being oxidized by the atmosphere and hence to prevent, for example, the coating portion from being peeled off from a core portion of the pin portion by oxidation. Accordingly, it is possible to prevent unnecessary reaction of the core portion with the plate members and to prolong the serve life of the tool.

The control device may execute the heat dissipation control in a shorter time than a time required for the joining control. This saves the time required for dissipating heat from the tool, so that it is possible to prolong the service life of the tool while restricting the reduction in work efficiency of joining the pair of plate members by spot joining.

A friction stir spot joining method according to an aspect of the present invention is a friction stir spot joining method of joining a pair of plate members by friction stirring with a pin portion of a tool, the method including a joining step of pushing the pin portion into the pair of plate members while the tool is rotated and causing the pin portion to pressurize the pair of plate members and a heat dissipation step of reducing at least one of a rotation speed and a pressurization three of the tool than in the joining step while the tool is rotated and the pin portion is kept pushed into the pair of plate members after the joining step and separating the tool from the pair of plate members after a surface temperature of the pin portion becomes less than an oxidation onset temperature.

Advantageous Effects of Invention

According to the present invention, it is possible to reduce the deterioration of the tool caused by oxidation by the atmosphere and maintain the durability performance of the tool by preventing the surface of the tool from being oxidized by the atmosphere after friction stir spot joining, thereby prolonging the service life of the tool.

BRIEF DESCRIPTION OF DRAWINGS

FIG. 2 is a side view of a joining unit in the friction stir spot joining apparatus in FIG. 1.

FIG. 3 is an operation flowchart of the friction stir spot joining apparatus in FIG. 1.

FIGS. 4(*a*) to 4(*d*) are sectional views for describing each process in friction stir spot joining using the friction stir spot joining apparatus in FIG. 1.

FIG. 5 is a graph showing time changes in the pressurization force and the rotation speed of a tool according to a comparative example.

FIG. 6 is a graph showing time changes in the maximum temperature of the surfaces of a shoulder portion and a pin portion according to the comparative example.

FIG. 7 is a diagram showing the surface temperature distribution of the tool according to the comparative example immediately after the tool is separated from plate members.

FIG. 8 is a diagram showing time changes in the pressurization force and the rotation speed of the tool according to an example.

FIG. 9 is a graph showing time changes in the maxim urn temperature of the surfaces of a shoulder portion and a pin portion according to the example.

FIG. 10 is a diagram showing the surface temperature distribution of the tool according to the example immediately after the tool is separated from plate members.

FIG. 11 is a graph showing the relationships between the numbers of joining spots (the friction stir spot joining counts) of plate members and the amounts of change in the diameters of pin portions according to the example and the comparative example.

DESCRIPTION OF EMBODIMENTS

Embodiment

Figure 1:
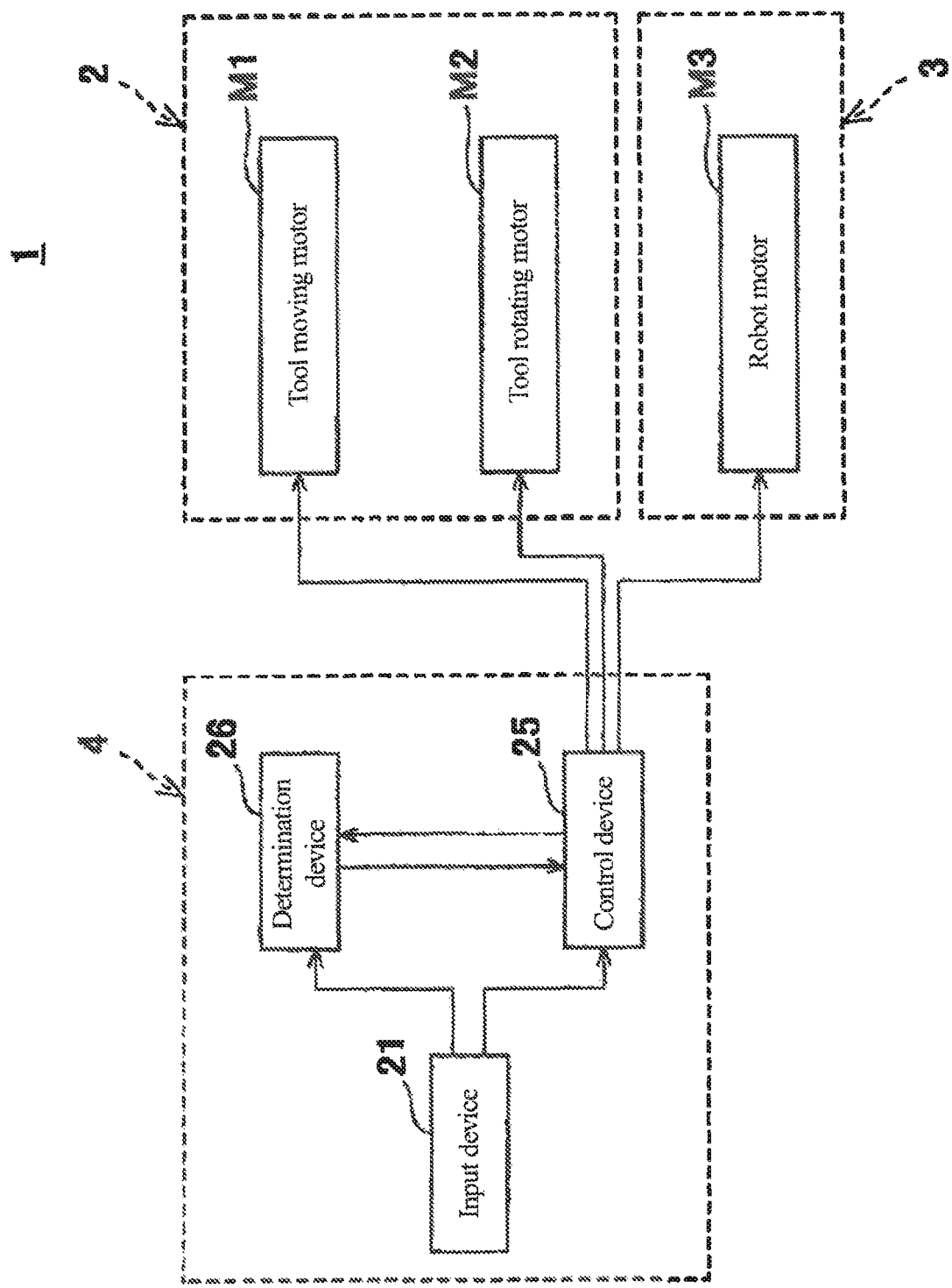
FIG. 1 is a functional block diagram of a friction stir spot joining apparatus according to an embodiment.

An embodiment will be described below with reference to the accompanying drawings.

FIG. 1 is a functional block diagram of a friction stir spot joining apparatus 1 (hereinafter simply referred to as a joining apparatus 1) according to the embodiment. FIG. 2 is a side view of a joining unit 2 in the joining apparatus 1 in FIG. 1. As shown in FIGS. 1 and 2, the joining apparatus 1 includes the joining unit 2, a multijoint robot 3, and a controller 4. The joining unit 2 has a frame portion 5, a unit main body 6, and a lining portion 7.

For example, the frame portion 5 has a C-shaped or inverted C-shaped appearance in side view, is connected to the unit main body 6 and the lining portion 7, and is supported by the multijoint robot 3. The unit main body 6 includes a rotating shaft portion 9, a tool 10, a tool moving motor M1 (advancing and retracting driving device), and a tool rotating motor M2 (rotational driving device). The rotating shaft portion 9 extends from the housing of the unit main body 6 toward the lining portion 7 and is provided so as to be able to approach or separate from the lining portion 7. A holder is provided at one end of the rotating shaft portion 9 in its axial direction which is located distant from the housing of the unit main body 6 so as to detachably hold the tool 10.

The tool 10 has a tool main body 10a, a shoulder portion 10b, and a pin portion 10c, and is provided so as to be able to come into contact with or separate from the surface of the plate member W2 on the opposite side to the plate member W1. The pin portion 10c protrudes from the tool main body 10a toward the lining portion 7 and is surrounded by the shoulder portion 10b. A coating portion 10e is formed on the surfaces of the shoulder portion 10b and the pin portion 10c. The coating portion 10e covers and protects the surface of the shoulder portion 10b and the surface of a core portion 10d of the pin portion 10c. The core portion 10d may be made of an alloy such as cemented carbide or nickel alloy, or ceramic. In addition, the coating portion 10e is composed of a nitride containing at least one of Ti and Al, or an oxide containing at least one of Ti and Al, but is not limited to them and may be made of ceramic. Further, the coating portion 10e may be omitted, and the core portion 10d may be exposed.

The motors M1 and M2 are provided in the housing of the unit main body 6. When the tool moving motor M1 is driven, the rotating shaft portion 9 and the tool 10 are advanced and retracted toward the plate members W1 and W2 in the axial direction of the rotating shaft portion 9. Further, when the tool rotating motor M2 is driven, the rotating shaft portion 9 and the tool 10 are rotated about the axis of the rotating shaft portion 9. The driving of each motor M1, M2 is controlled by the controller 4.

For example, the lining portion 7 has a columnar appearance shape extending from the frame portion 5 toward the unit main body 6, and supports the plate member W1 from below. The distal end portion of the lining portion 7 in the axial direction comes into contact with the surface of the plate member W1 on the opposite side to the plate member W2.

The multijoint robot 3 has a robot motor M3, and moves the joining unit 2 to a predetermined position. The driving of the robot motor M3 is controlled by the controller 4. The robot motor M3 may include a plurality of motors.

The controller 4 is a computer including a CPU, a ROM, and a RAM, and controls each operation of the joining unit 2 and the multijoint robot 3. The controller 4 has an input device 21, a control device 25, and a determination device 26. The input device 21 receives information input by an operator. A predetermined control program is stored in the ROM. The RAM is configured to store setting information input via the input device 21. The setting information includes, for example, information on each plate thickness value of the plate members W1 and W2 and information on each joining position of the plate members W1 and W2.

The control device 25 controls each of the motors M1 to M3 based on the control program. Based on the control program, the determination device 26 determines whether friction stir spot joining at all joining positions is completed at a predetermined timing.

Next, a method of joining the plate members W1 and W2 made of steel by friction stir spot joining using the joining apparatus 1 will be exemplified. FIG. 3 is an operation flowchart of the joining apparatus 1 in FIG. 1. As shown in FIG. 3, the joining apparatus 1 performs an alignment process (step S1), a joining process (step S2), a heat dissipation process (step S3), and a completion determination process (step S4) are performed in this order. If there is a remaining joining position, an alignment process is performed again. FIGS. 4(a) to 4(d) are sectional views for describing each process in friction stir spot joining using the joining apparatus 1 in FIG. 1.

First, the operator inputs the setting information to the joining apparatus 1 via the input device 21, and makes a predetermined jig hold the plate members W1 and W2 in an overlaid state. As shown in FIG. 4(a), the control device 25 then performs alignment control to move the joining unit 2 to a position corresponding to one joining position of the plurality of joining positions so as to make the distal end portion of the lining portion 7 support the plate member W1 such that the tool 10 and the lining portion 7 are respectively disposed on the plate member W2 side and the plate member side (step S1).

As shown in FIG. 4(b), the control device 25 performs joining control to control the motors M1 and M2 to push the pin portion 10c into the plate members W1 and W2 so as to pressurize the plate members W1 and W2 while the tool 10 is rotated (step S2). During the joining control, the tool 10 is heated by the frictional heat generated between the tool 10 and the plate members W1 and W2. In this case, for example, because the plate members W1 and W2 made of steel are joined by friction stir spot joining, the tool 10 is heated to a higher temperature than when a pair of plate members made of, for example, aluminum are joined to each other, and the surface temperature of the tool rises to a temperature higher than the oxidation onset temperature of the surface of the pin portion 10c. In this case, the surface of the pin portion 10c is the contact surface of the pin portion 10c which comes into contact with the plate members W1 and W2 when the tool 10 is pushed into the plate members W1 and W2. When the coating portion 10e is formed on the pin portion 10c, the above surface indicates the contact surface of the surface of the coating portion 10e which comes into contact with the plate members W1 and W2. When the coating portion 10e is not formed on the pin portion 10c, the above surface indicates the contact surface of the surface of the core portion 10d which comes into contact with the plate members W1 and W2.

Subsequently, the control device 25 performs heat dissipation control to control the motors M1 and M2 to reduce at least one of the rotation speed and the pressurization force of the tool 10 as compared with that in the joining control while the tool 10 is rotated and the pin portion 10c is pushed into the plate members W1 and W2, and to separate the tool 10 from the plate members W1 and W2 after the surface temperature of the pin portion 10c becomes lower than the oxidation onset temperature (step S3). In this case, the control device 25 controls each of the motors M1 and M2 so as to reduce both the rotation speed and the pressurization force of the tool 10 compared with the case of joining control. Further, the control device 25 performs heat dissipation control in a shorter time than the joining time required for the joining control. Letting the heat of the pin portion 10c escape to the plate members W1 and W2 while keeping the pin portion 10c pushed into the plate members W1 and W2 prevents the surface of the pin portion 10c from being exposed to the atmosphere at a temperature higher than the oxidation onset temperature when the tool 10 is separated from the plate members W1 and W2.

In this case, the rotation speed of the tool 10 at the time of heat dissipation control can be set as necessary. For example, this rotation speed may be a value that prevents the tool 10 from sticking to the plate members W1 and W2. For example, the rotation speed of the tool 10 at the time of heat dissipation control preferably falls within the range from 0 rpm exclusive to 500 rpm inclusive. When the risk that the tool 10 may stick to the plate members W1 and W2 is low, the rotation of the tool 10 may be stopped at the time of heat dissipation control.

In this case, the pressurization force of the tool 10 at the time of heat dissipation control can be set as necessary. For example, this pressurization force may be a value that allows the surface of the pin portion 10c of the tool 10 to come into contact with the plate members W1 and W2. For example, the pressurization force of the tool 10 at the time of heat dissipation control preferably falls within the range from 0 N exclusive to 5,000 N inclusive.

The heat dissipation time during which the tool 10 is kept in contact with the plate members W1 and W2 after joining control can be set as necessary. For example, it is sufficient as long as this heat dissipation time is the minimum time required to lower the surface temperature of the pin portion 10c to a temperature less than the oxidation onset temperature in accordance with, for example, each of the set values of the rotation speed and the pressurization force of the tool 10 at the time of heat dissipation control.

For example, in the joining apparatus 1, when the control performed by the control device 25 is shifted from joining control to heat dissipation control, each of the rotation speed and the pressurization force of the tool 10 decreases to at least 50% or less of each of the rotation speed and the pressurization force at the time of joining control. This rapidly reduces the frictional heat generated between the tool 10 and the plate members W1 and W2 and promotes the dissipation of heat front the pin portion 10c to the plate members W1 and W2.

For example, the rotation speed, the pressurization force, and the heat dissipation time of the tool 10 at the time of heat dissipation control are set in accordance with the material for the surface of the tool 10, various properties (such as friction coefficient and thermal conductivity) of the surface of the tool 10, the material for the plate members W1 and W2, the surface temperature distribution of the tool 10 at the time of heat dissipation control, and the like. The oxidation onset temperature of the surface of the pin portion 10c is specified by the material for the surface of the pin portion 10c. The oxidation onset temperature of the surface of the pin portion 10c is specified by the material for the coating portion 10e when the coating portion 10e is formed on the pin portion 10c, and is specified by the material for the core portion 10d when the coating portion 10e is not formed on the pin portion 10c. The surface temperature of the pin portion 10c after friction stir spot joining can be measured using, for example, a thermometer such as a thermographic apparatus or a thermocouple. Accordingly for example, the rotation speed, the pressurization force, and the heat dissipation time of the tool 10 at the time of heat dissipation control may be specified in advance by a preceding experiment such that the surface temperature of the pin portion 10c becomes lower than the oxidation onset temperature before the pin portion 10c is separated from the plate members W1 and W2, and may be set in the control device 25.

The joining apparatus 1 may include a thermometer that can measure the surface temperature of the pin portion 10c. In this case, at the time of heat dissipation control, the determination device 26 may monitor the measured value of the thermometer and cause the control device 25 to control the tool moving motor M1 so as separate the pin portion 10c from the plate members W1 and W2 after the surface temperature of the pin portion 10c becomes less than the oxidation onset temperature.

At the time of heat dissipation control, the relative position between the tool 10 and the plate members W1 and W2 may be changed. For example, the control device 25 may control the tool moving motor M1 so as to dissipate heat from the tool 10 to the plate members W1 and W2 while gradually separating the tool 10 from the plate members W1 and W2 joined by friction stir spot joining at a lower speed than the moving speed of the tool 10 when the pin portion 10c is pushed into the plate members W1 and W2 at the time of joining control. For example, the control device 25 may control the tool moving motor M1 such that the moving speed of the tool 10 until the pin portion 100 in contact with the plate members W1 and W2 is separated from the plate members W1 and W2 at the time of heat dissipation control becomes lower than the moving speed of the tool 10 when the pin portion 10c separated from the plate members W1 and W2 further moves away from the plate members W1 and W2.

When the pressurization force of the tool 10 is increased, the portion of the frame portion 5 to which the lining portion 7 is connected is deflected in the direction to pressurize the plate members W1 and W2 with the tool 10. When the pressurization force of the tool 10 is reduced, the deflection of the portion of the frame portion 5 to which the lining portion 7 is connected sometimes disappears and the frame portion 5 is restored to its original shape. In this case, for example, by setting the moving speed of the tool 10 when the tool 10 is separated from the plate members W1 and W2 joined by friction stir spot joining to be equal to or lower than the restoring speed of the shape of the frame portion 5, it is possible to keep the relative position between the tool 10 and the plate members W1 and W2 constant so as to keep the tool 10 and the plate members W1 and W2 in contact with each other and efficiently dissipate heat from the tool 10 to the plate members W1 and W2 until the shape of the frame portion 5 is restored after the tool 10 starts to move in the direction in which the tool 10 is separated from the plate members W1 and W2 joined by friction stir spot joining.

After completion of the heat dissipation step (step S3), the determination device 26 determines whether joining at all joining positions is completed (step S4). In the completion determination step, when the determination device 26 determines that joining at all the joining positions of the plate members W1 and W2 is not yet completed, the control device 25 controls the robot motor M3 to move the tool 10 to the next joining position, thus performing the alignment step (step S1) again.

As described above, in the joining apparatus 1, because the surface temperature of the pin portion 10c is lower than the oxidation onset temperature when the tool 10 is separated from the plate members W1 and W2 after friction stir spot joining, the surface of the pin portion 10c can be prevented from being oxidized by the atmosphere. This can reduce deterioration in the tool 10 and prolong the service life of the tool 10 by maintaining the durability performance of the tool 10. Accordingly, even when friction stir spot joining is performed continuously at a plurality of joining positions on the plate members W1 and W2, the tool 10 can be used stably and the cost of the tool 10 can be reduced.

Because the surface temperature of the shoulder portion 10b is usually equal to or lower than the surface temperature of the pin portion 10c when the tool 10 after friction stir spot joining is separated from the plate members W1 and W2, it is possible to prevent the surface of the shoulder portion 10b from being oxidized by the atmosphere by separating the tool 10 from the plate members W1 and W2 after the surface temperature of the pin portion 10c becomes lower than the oxidation onset temperature. The surface of the shoulder portion 10b indicates the contact surface of the shoulder portion 10b which comes into contact with the plate members W1 and W2 when the tool 10 is pushed into the plate members W1 and W2.

In addition, when the coating portion 10e is formed on the surface of the pin portion 10c, it is possible to prevent, for example, the coating portion 10e from being peeled off from the core portion 10d by the oxidation of the coating portion 10e because it is possible to prevent the coating portion 10e from being oxidized by the atmosphere. This makes it possible to prevent unnecessary reaction between the core portion 10d and the plate members W1 and W2, thereby prolonging the service life of the tool 10.

Even when the oxidation onset temperature of the surfaces of the shoulder portion 10b and the pin portion 10c is relatively low, the service life of the tool 10 can be prolonged. Accordingly, when the coating portion 10e is formed on the surfaces of the shoulder portion 10b and the pin portion 10c, even the tool 10 having the coating portion 10e made of a relatively inexpensive material having a low oxidation resistance temperature can be stably used, and the cost associated with the tool 10 can be further reduced properly. Further, by rotating the tool 10 during heat dissipation control, the surfaces of the shoulder portion 10b and the pin portion 10c can be hardly fixed to the plate members W1 and W2.

The control device 25 may perform heat dissipation control to reduce at least one of the rotation speed and the pressurization force of the tool 10 as compared with that in the joining control while the tool 10 is rotated and the pin portion 10c is pushed into the plate members W1 and W2 and to separate the tool 10 from the plate members W1 and W2 after the surface temperature of the shoulder portion 10b and the pin portion 10c becomes lower than the oxidation onset temperature. This can further prevent the surfaces of the shoulder portion 10b and the pin portion 10c after friction stir spot joining from being oxidized by the atmosphere.

Confirmation Test

As tools according to a comparative example and an example, tools 10 of the same specification were used, each of which included a core portion 10d composed of silicon nitride ($Si_3N_4$), with a coating portion 10e made of titanium nitride (TiN) being formed on the surfaces of a shoulder portion 10b and a pin portion 10c. In each of the joining apparatuses according to the comparative example and the example, the pressurization force of the tool 10 at the time of joining control was set to 11,760 N, the rotation speed of the tool 10 at the time of joining control was set to 1,000 rpm, and the joining time was set to 5.0 sec.

FIG. 5 is a graph showing time changes in the pressurization force and the rotation speed of the tool 10 according to the comparative example. FIG. 6 is a graph showing time changes in the maximum temperature of the surfaces of the shoulder portion 10b and the pin portion 10c according to the comparative example. FIG. 7 is a diagram showing the surface temperature distribution of the tool 10 according to the comparative example immediately after the tool 10 is separated from the plate members W1 and W2. Referring to FIG. 7, the surface temperature distribution of the tool 10 according to the comparative example immediately after the tool 10 was separated from the plate members W1 and W2 joined at a joining position by friction stir spot joining was measured with a thermographic apparatus. The surface temperature distribution of the tool 10 is shown, with the distribution being divided into a plurality of temperature regions.

As shown in FIG. 5, in the comparative example, the tool 10 was separated from the plate members W1 and W2 immediately after the plate members W1 and W2 were joined by friction stir spot joining. As shown in FIG. 6, the maximum temperature of the side surface of the pin portion 10c when the tool 10 was separated from the plate members W1 and W2 was 958.1° C. which was higher than the oxidation onset temperature (600° C.) of the coating portion 10e. As shown in FIG. 7, it was confirmed that in the surface temperature distribution of the tool 10 immediately after the tool 10 was separated from the plate members W1 and W2, the temperatures of substantially the entire region of the contact surface of the shoulder portion 10b with the plate members W1 and W2 and of the region of substantially ⅔ of the surface of the pin portion 10c exceeded 600° C.

FIG. 8 is a diagram showing time changes in the pressurization force and the rotation speed of the tool 10 according to the example. FIG. 9 is a graph showing time changes in the maximum temperature of the surfaces of the shoulder portion 10b and the pin portion 10c according to the example. FIG. 10 is a diagram showing the surface temperature distribution of the tool 10 according to the example immediately after the tool 10 was separated from the plate members W1 and W2. FIG. 10 shows the surface temperature distribution of the tool 10 by the same method as in FIG. 7. In the example, the pressurization force value of the tool 10 at the time of heat dissipation control was set to 1,000 N, the rotation speed value of the tool 10 was set to 100 rpm, and the heat dissipation time was set to 2.5 sec.

As shown in FIG. 8, in the example, by dissipating the heat of the tool 10 after the friction stir spot joining to the plate members W1 and W2, the surface temperature of the pin portion 10c became lower than the oxidation onset temperature of the coating portion 10e. The tool 10 was then separated from the plate members W1 and W2. As shown in FIG. 9, the maximum temperature of the side surface of the pin portion 10c when the tool 10 was separated from the plate members W1 and W2 was 400.5° C. which was lower than the oxidation onset temperature of the coating portion 10e. As shown in FIG. 10, it was confirmed that in the surface temperature distribution of the tool 10 immediately after the tool 10 was separated from the plate members W1 and W2, the temperature of substantially the entire region of the contact surface of the shoulder portion 10b with the plate members W1 and W2 and of substantially the entire region of the surface of the pin portion 10c decreased to 400° C. or less. Accordingly, it was confirmed that the surface temperature of the shoulder portion 10b and the pin portion 10c immediately after the tool 10 was separated from the plate members W1 and W2 was able to be reduced to the oxidation onset temperature or less by appropriately dissipating heat from the tool 10 after friction stir spot joining.

Next, the amount (decrease amount) of change in the diameter of the pin portion 10c when the plate members W1 and W2 were continuously joined by friction stir spot joining at a plurality of joining positions was examined using each of the joining apparatuses according to the example and the comparative example. FIG. 11 is a graph showing the relationship between the number of joining spots (friction stir spot joining counts) of the plate members W1 and W2 and the amounts of change in the diameter of the pin portion 10c according to the example and the comparative example. As shown in FIG. 11, it was confirmed that in the comparative example, the amount of change in the diameter of the pin portion 10c gradually increased from around the time when the number of joining spots exceeded 100 as compared with the example. One of the reasons for this is considered to be that after the plate members W1 and W2 were joined by friction stir spot joining at each joining position, the coating portion 10e heated to a high temperature was oxidized by being exposed to the atmosphere and gradually peeled off, and the core portion 10d was exposed and reacted with the plate members W1 and W2 to thereby promote the abrasion of the pin portion 10c.

As compared with the comparative example, it was confirmed that in the example, the amount of change in the diameter of the pin portion 10c was restricted even after the number of joining spots exceeded 100. One of the reasons for this is considered to be that after the plate members W1 and W2 were joined by friction stir spot joining at each joining position, the tool 10 was separated from the plate members W1 and W2 after the surface temperature of the pin portion 10c became lower than the oxidation onset temperature to thereby prevent the surface of the tool 10 from being oxidized by the atmosphere and prevent peeling and abrasion of the coating portion 10e.

REFERENCE SIGNS LIST

M1 tool moving motor (advancing and retracting driving device)
M2 tool rotating motor (rotationally driving device)
W1, W2 plate member
1 joining apparatus
10 tool
10c pin portion
10e coating portion
25 control device

The invention claimed is:

1. A friction stir spot joining apparatus for spot-joining a pair of plate members by friction stirring with a pin portion of a tool, the apparatus comprising:
   an advancing and retracting driving device configured to advance and retract the tool to and from the pair of plate members;
   a rotationally driving device configured to rotate the tool; and
   a controller including a processor and a storage medium read by the processor, the storage medium storing a control program specifically configured to execute:
      setting a predetermined oxidation onset temperature of the pin portion, wherein the predetermined oxidation onset temperature is based on a coating material of the pin portion;
      controlling advancing and retracting of driving device and the rotationally driving device;
      pushing the pin portion into the pair of plate members while the tool is rotated and causing the pin portion to pressurize the pair of plate members; and
      after pushing the pin portion into the pair of plate members, setting at least one of a rotation speed or a pressurization force of the tool while the tool is rotated and the pin portion is pushing into the pair of plate members to maintain a surface temperature of the pin portion that is above the predetermined oxidation onset temperature; and
      separating the tool from the pair of plate members after the surface temperature of the pin portion becomes less than the predetermined oxidation onset temperature.

2. The friction stir spot joining apparatus according to claim 1, wherein the surface temperature of the pin portion is a surface temperature of a coating portion formed on the pin portion.

3. The friction stir spot joining apparatus according to claim 1, wherein the controller is configured to reduce at least one of the rotation speed or the pressurization force of the tool in less time than a time required for pushing the pin portion into the pair of plate members.

4. A friction stir spot joining method of joining a pair of plate members by friction stirring with a pin portion of a tool, the method comprising:
   setting a predetermined oxidation onset temperature of the pin portion, wherein
   the predetermined oxidation onset temperature is based on a coating material of the pin portion;
   pushing the pin portion into the pair of plate members while the tool is rotated and causing the pin portion to pressurize the pair of plate members; and
   after pushing the pin portion into the pair of plate members, reducing at least one of a rotation speed or a pressurization force of the tool while the tool is rotated and the pin portion is being pushed into the pair of plate members; and separating the tool from the pair of plate members after a surface temperature of the pin portion becomes less than the predetermined oxidation onset temperature.

5. The friction stir spot joining apparatus according to claim 1, wherein:

the advancing and retracting driving device includes a tool moving motor; and the rotationally driving device includes a rotationally moving motor.

6. The friction stir spot joining apparatus of claim 1, wherein the coating material is selected from a group consisting of: nitride, titanium, aluminum and ceramic.

* * * * *